Jan. 13, 1953      A. G. GOODNIGHT      2,624,999
MOWING APPARATUS
Filed Nov. 10, 1947      5 Sheets-Sheet 1
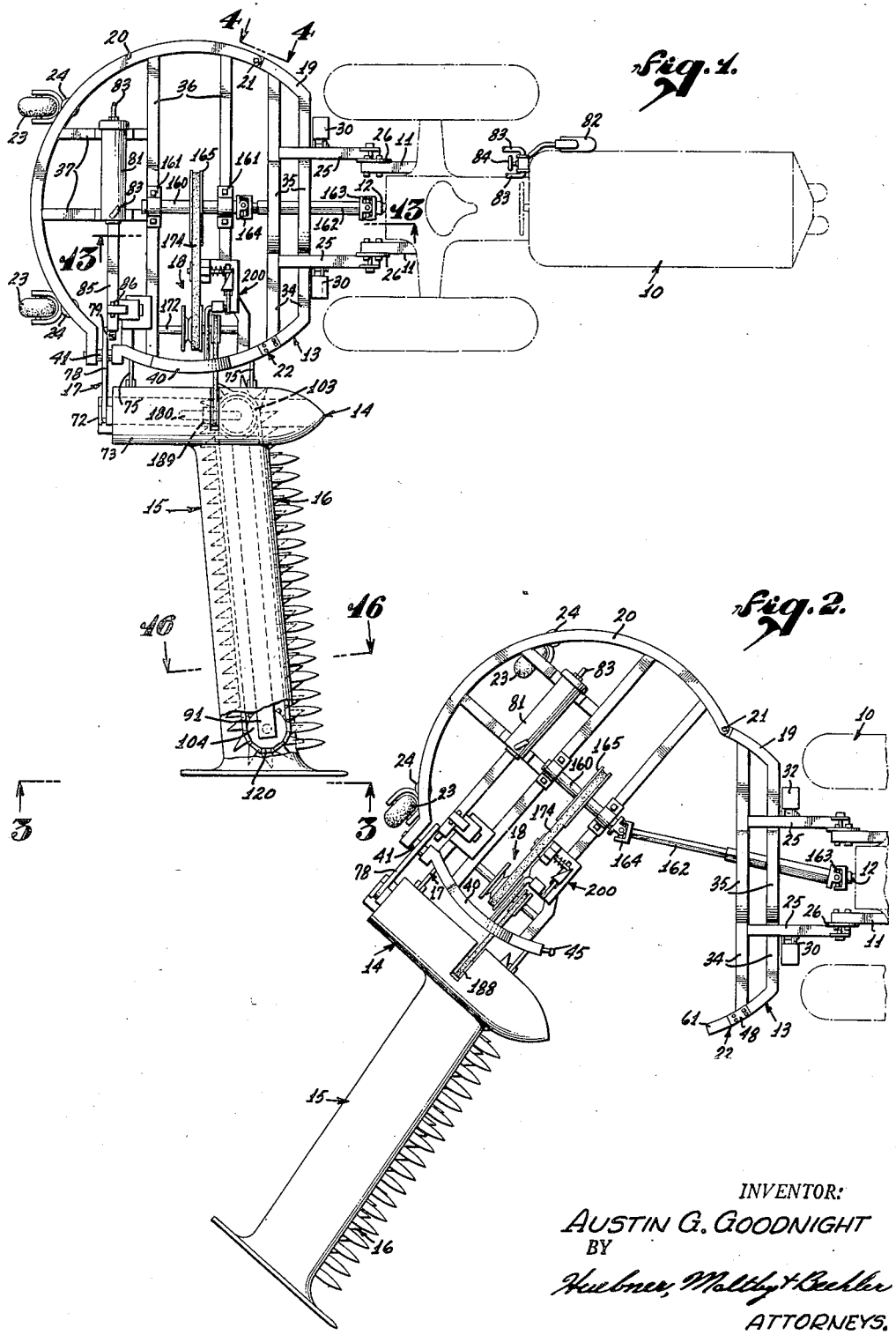
INVENTOR:
AUSTIN G. GOODNIGHT
BY
Huebner, Maltby & Beehler
ATTORNEYS.

Jan. 13, 1953 A. G. GOODNIGHT 2,624,999
MOWING APPARATUS
Filed Nov. 10, 1947 5 Sheets-Sheet 2
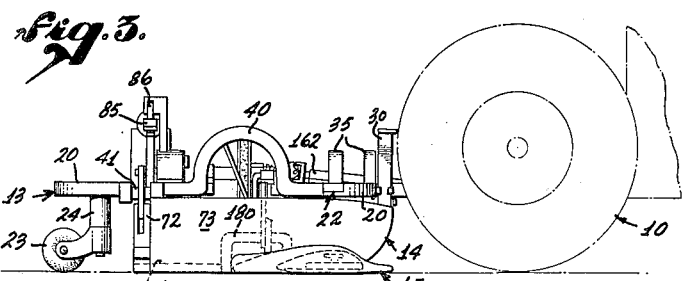
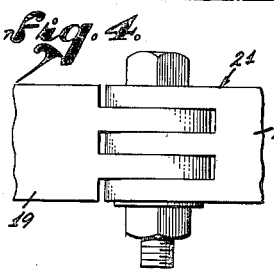
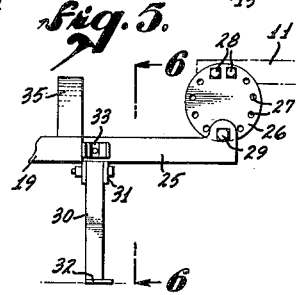
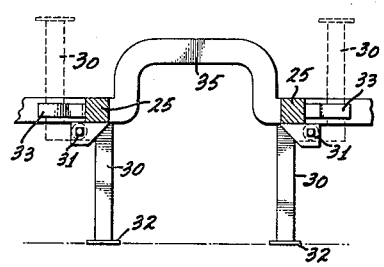
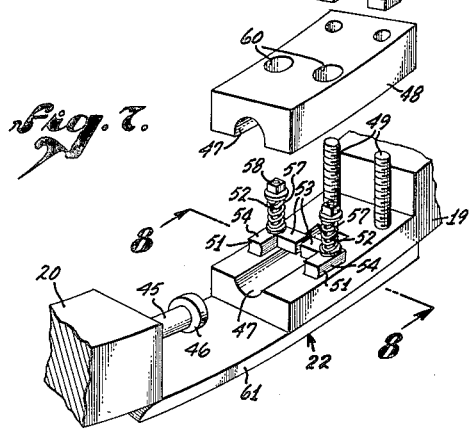
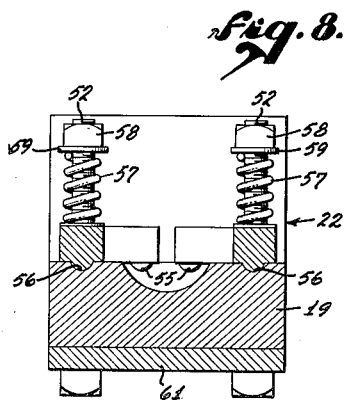
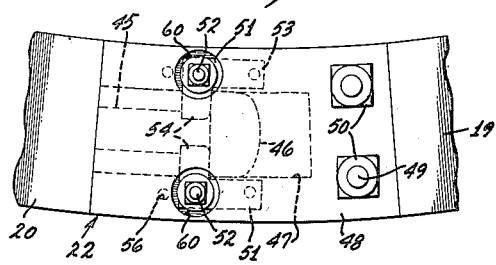
INVENTOR:
AUSTIN G. GOODNIGHT
BY
Huebner, Maltby & Bechler
ATTORNEYS.

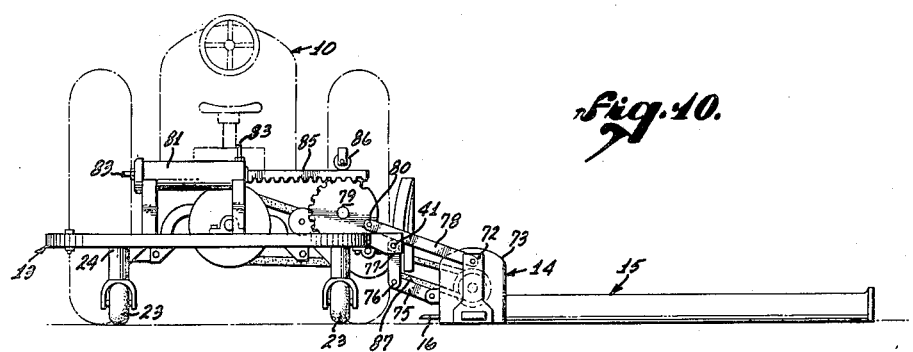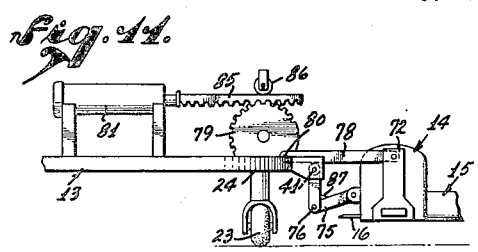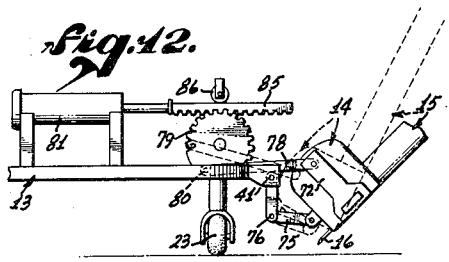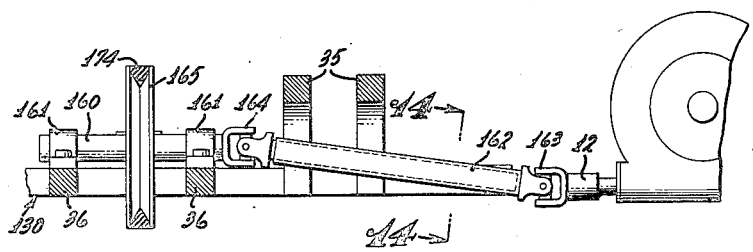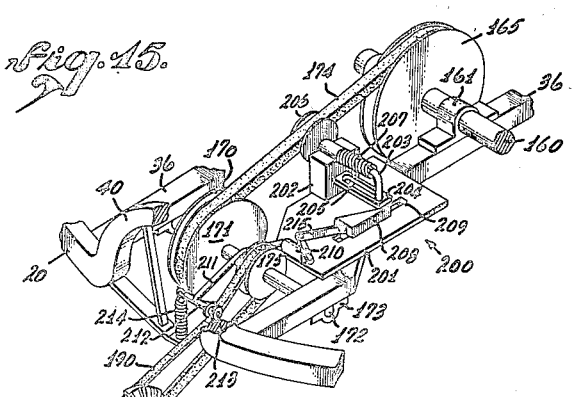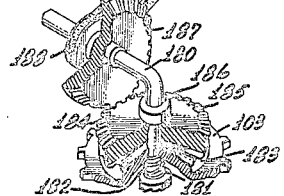

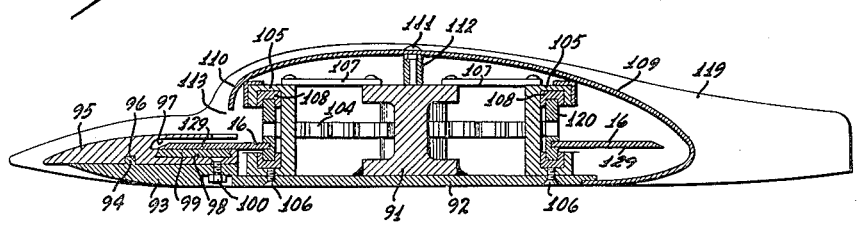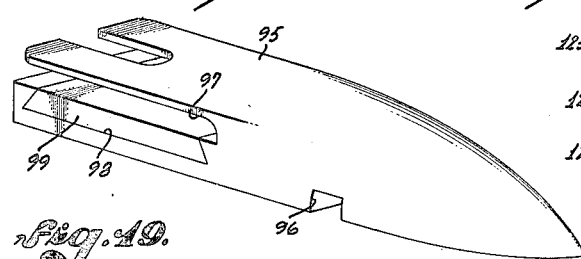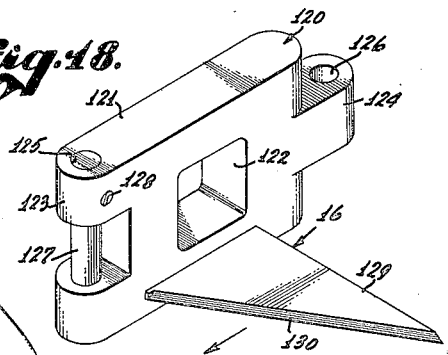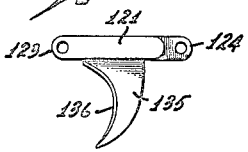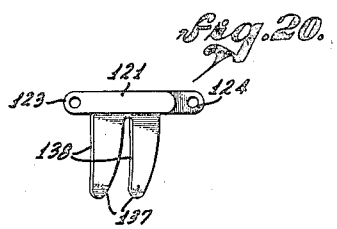

Jan. 13, 1953   A. G. GOODNIGHT   2,624,999
MOWING APPARATUS
Filed Nov. 10, 1947   5 Sheets-Sheet 5
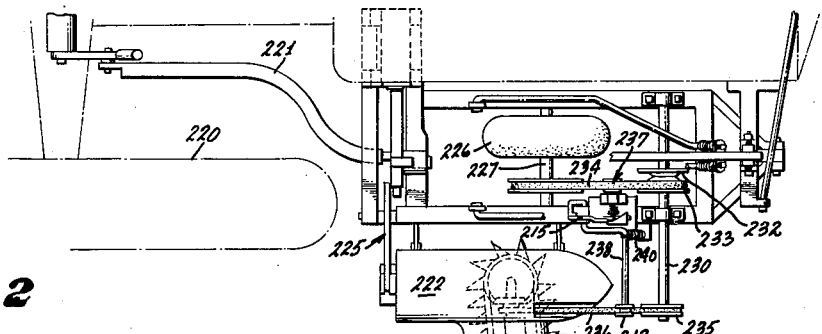
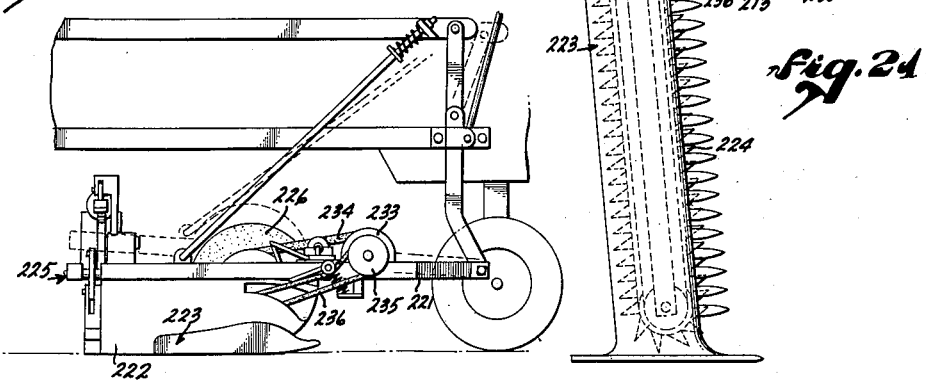
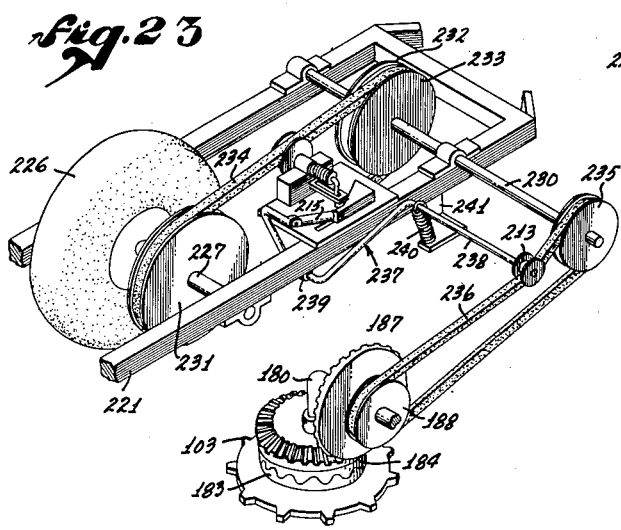
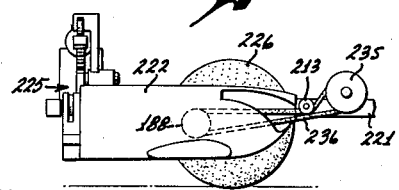
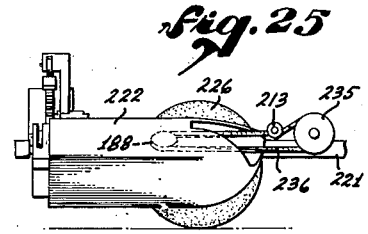
INVENTOR:
AUSTIN G. GOODNIGHT
BY
Huebner, Maltby & Beeler
ATTORNEYS.

Patented Jan. 13, 1953

2,624,999

UNITED STATES PATENT OFFICE 2,624,999

MOWING APPARATUS

Austin G. Goodnight, Hanford, Calif.

Application November 10, 1947, Serial No. 784,967

9 Claims. (Cl. 56—25)

The present invention relates to mowing apparatus and more particularly to mowers employed in the harvesting of grain, straw, hay crops, and the like.

It is a practice of long standing to cut grain, straw, hay crops, and the like by mechanical means. Mowing machines directed to the accomplishment of such mechanical cutting operations have proved of great value but have been subject to certain difficulties, to the overcoming of which the present invention is directed. Conventional mowing machines are not readily adaptable to varied operational conditions and environments. It is difficult to adjust the cutting means of such machines to wide ranges of elevation relative to traversed terrain. Being poorly adapted to varied conditions, the machines are frequently damaged and require periodic repair. Such mowing machines usually incorporate a sickle which is reciprocated adjacent guard elements to exercise shearing action on encountered crops. The reciprocating sickle and other parts are productive of vigorous vibration imposing severe operational strains on the machines. Normally the sickles are reciprocally motivated in a definite relationship to ground traversing speed of the machines, thus the cutting speed of the sickles bear a constant relation to ground traversing speed making no allowance for varied cutting requirements. This causes the sickle and the guards to clog when green hay or other difficult crops to cut are encountered. Further, the sickle is conventionally positively driven and positively positioned. When such a sickle or its sickle bar encounters an unyielding obstruction, such positive positioning and driving results in material damage to the machine.

An object to the present invention, therefore, is to provide an improved mower characterized by adaptability to varied operational requirements.

Another object is to provide a mower having improved safety, speed and efficiency characteristics.

Another object is to provide in a mower positive elevational control of the cutting means thereof.

Another object is to provide an improved mower characterized by an elimination of wear, deterioration and vibration incident to reciprocating elements conventionally employed in mowing machines.

Another object is to provide a mower having conveniently replaceable parts subjected to wear and other operational deterioration.

Another object is to provide an improved cutting means in mowers having unidirectional orbital travel for cutting purposes.

Another object is to provide automatic speed control for such cutting means.

Another object is to monitor such a speed control in response to resistance offered to mowing action of the cutter.

Another object is to provide improved safety features in mowing machines.

Another object is to provide in a mower for the automatic interruption of the motivation of a cutter thereof when said cutter encounters an obstruction to cutting action of sufficient magnitude to impair structural safety of the cutter and the mower.

Another object is to provide in a mower having a laterally extending sickle bar, means for releasing the bar for rearward pivoting in response to rearward pressure exerted on the bar in excess of a predetermined magnitude.

Another object is to provide cutting teeth of improved form for mowing machine sickles.

Other objects and advantages will become apparent in the subsequent description in the specification.

In the drawings:

Fig. 1 is a plan view of a mower embodying the principles of the present invention shown in operational relationship to a draft appliance.

Fig. 2 is a plan view of the mower of the present invention showing portions of a frame of said mower in relative pivotal positions.

Fig. 3 is a side elevation of the mower as seen from line 3—3 in Fig. 1.

Fig. 4 is an enlarged fragmentary elevation of the frame of the mower as seen from 4—4 in Fig. 1.

Fig. 5 is a fragmentary view of a forward portion of the frame of the mower and draft connection therefor.

Fig. 6 is a fragmentary view of a portion of the frame of the mower as seen from line 6—6 in Fig. 5.

Fig. 7 is an exploded view of a latch member employed in the frame.

Fig. 8 is an enlarged section taken on line 8—8 of Fig. 7.

Fig. 9 is an enlarged plan view of the latch illustrated in Figs. 7 and 8.

Fig. 10 is a rear view of the mower of the present invention shown in operational position relative to the draft appliance.

Fig. 11 is a fragmentary schematic view illustrating the operation of a mounting means for the shoe and sickle bar of the mower showing the latter in slightly elevated position for cutting purposes.

Fig. 12 is a schematic diagram showing the elements illustrated in Fig. 11, demonstrating further elevation of the shoe and sickle bar and tipping of the same. Fig. 12 also illustrates in dotted line the shoe and sickle bar moved to inoperative position as for transporting purposes.

Fig. 13 is a fragmentary view of a portion of the driving means of the present invention as seen from line 13—13 in Fig. 1.

Fig. 14 is an enlarged section taken on line 14—14 of Fig. 13.

Fig. 15 is a perspective view of a drive linkage and monitoring means of the present invention.

Fig. 16 is an enlarged section taken on line 16—16 of Fig. 1.

Fig. 17 is an enlarged perspective view of a guard employed in the mower.

Fig. 18 is an enlarged perspective view of a link of the sickle of the present invention.

Figs. 19 and 20 are plan views of modified links of the sickle of the present invention adapted for specific uses.

Fig. 21 is a fragmentary plan view of a draft appliance showing mounted thereon a modified frame and driving means of the present invention mounting and motivating the shoe, sickle bar, and sickle already described.

Fig. 22 is a fragmentary side elevation of the mower illustrated in Fig. 21.

Fig. 23 is an enlarged perspective view of a driving linkage employed in the mower of Figs. 21 and 22.

Figs. 24 and 25 illustrate the elevational positioning of the shoe, sickle bar and sickle employed in the second form of the mower.

Referring in greater detail to the drawings:

In Figs. 1, 2, 3, and 10, a tractor is indicated generally at 10, illustrative of draft appliances generally having rearwardly disposed draft connections 11 and providing a rotary power take-off 12. It will be clearly apparent that the present invention is not limited to use with a draft appliance of the type shown but may be suitably employed with other appliances providing earth traversing motivation. The mower of the present invention, for example, is advantageously employed with reapers, harvesters and other earth traversing means.

For purposes of descriptive convenience brief preliminary attention is devoted to major elements and subassemblies of the mower of the present invention. In Figs. 1 and 2 a draft frame is indicated generally at 13, a shoe at 14, a sickle bar at 15, a sickle at 16, mounting means for the shoe, sickle bar, and sickle at 17, and a drive linkage at 18.

The draft frame 13 has a forward portion 19 and a rearward portion 20 shown in drawing relation to the tractor 10. The frame is preferably substantially circular in form. The forward and rearward portions of the frame are hingeably connected, as at 21 in Fig. 1 and as shown in greater detail in Fig. 4, at a side of the frame for relative pivotal movement in a substantially horizontal plane common to both portions. A latch 22, presently more fully described, releasably interconnects the forward and rearward portions of the frame at a side thereof opposite the hinged interconnecting of said portions. The latch is preferably responsive to drag imposed upon its side of the rearward portion of the frame so that when such drag exceeds a predetermined magnitude, the latch releases the rearward portion of the frame for rearward pivotal movement. A pair of support wheels 23 are swivelly mounted as at 24 in supporting relation to the rearward portion of the frame so as to maintain the rearward portion of the frame in a plane common to both portions of the frame independent of its latched or unlatched condition. The forward portion of the frame preferably provides forwardly extended tongue elements 25. The forwardly extended end portions of the tongue elements mount erect, circular mounting plates 26, as seen in detail in Fig. 5. The mounting plates preferably provide pin receptacles 27 arranged in a pattern concentric to the plate. The mounting plates are each fixedly connected to the draft connections 11, as by a pair of connecting bolts 28, engaged in a pair of adjacent pin receptacles and passed through the draft connections. The tongue elements are connected to the mounting plates and thus to the draft connections by means of pins 29 passed through openings in the forward end portions of the tongue elements 25. The plurality of pin receptacles arranged as described provide convenient elevational adjustment of the front of the frame in relation to the draft connections. The concentricity of the arrangement of the pin receptacles in the mounting plates has been found conducive to connecting convenience requiring a minimum of tractor and frame manipulation to bring the openings in the tongue elements into juxtaposed position with pin receptacles of a desired elevation.

Connecting and disconnecting convenience is further enhanced by support brackets 30 shown in retracted position in Figs. 1, 2 and 3 and in frame sustaining position in Fig. 6. The support brackets are conveniently L-shaped, having angularly related leg elements, and each is connected near an end portion of a leg element to an outwardly disposed side of a respective tongue element, as at 31, for pivotal movement transversely disposed the tongue elements. To support the frame the brackets are positioned so that mounting legs of the L-shaped structures extend inwardly in supporting relation to the tongue elements and the other legs thereof extend downwardly for ground engagement. Feet 32 are preferably provided on the downwardly extended ends of the brackets to furnish increased supporting area in earth engagement. When not in use, the brackets are swung outwardly and upwardly as shown in dotted line in Fig. 6 and maintained in such inoperative position by means of spring clips 33 of any suitable form mounted on the tongue elements adjacent the brackets and selectively engaged therewith.

To impart strength and rigidity to the forward portion 19 of the draft frame, a pair of substantially parallel braces 34 are provided transversely disposed therein. Said elements are preferably connected to the circular side portions of the frame and to the tongue elements as by welding. The transverse elements are upwardly arched near their mid-portions as at 35 to provide clearance for a driving means presently more fully described. A pair of substantially parallel bearing supports 36 are provided transversely disposed the rearward portion of the frame and secured to opposite sides thereof as by welding. Control mounting struts 37 are fixedly interconnected the rear of the rearward portion 20 of the frame and the rearmost of the bearing supports.

As previously described, the frame is substantially circular in form. A segment of the rearward portion of the frame at the side thereof on which the latch is provided is upwardly arched as at 40 to accommodate a drive linkage, also presently more fully described. Rearwardly adjacent the arched portion 40 the circular periphery of the frame is interrupted and a bearing 41 interposed therein in substantial alignment with the normal direction of movement of the draft appliance and frame. The bearing is preferably mounted so as to join the segments of the rearward portion of the frame, formed by the interposition of the bearing, without impairing the structural rigidity or unitary character of said rearward frame portion. The bearing will subsequently be referred to herein as a fulcrum bearing for a positioning arm yet to be described.

The latch 22 is illustrated in detail in Figs. 7, 8 and 9. A bolt 45, having an enlarged extended end portion 46, is mounted in substantial alignment with the periphery of the frame and forwardly extended from the rearward portion 20 thereof. The forward portion 19 of the frame is provided with a catch mechanism juxtaposed the bolt to receive and releasably embrace the same. The catch conveniently comprises a substantially cylindrical opening 47 formed in said forward portion of the frame and of a diameter sufficient to receive the enlarged end portion of the bolt when aligned therewith. For convenience in assembly and disassembly, the forward portion of the frame is divided longitudinally of the opening 47 formed therein and horizontally to form a cap piece 48. The cap piece is releasably secured in place on said forward portion of the frame by means of bolts 49 and nuts 50. A pair of L-shaped catch elements 51 are pivotally mounted on the forward portion of the frame adjacent the opening 47 by means of posts 52 for substantially horizontal pivotal movement. The catch elements have angularly related trigger legs 53 and bolt embracing legs 54. The bolt embracing legs are preferably concave at their terminal end portions so as to receive the bolt in intimate engagement. As shown in Fig. 8, each leg of each of the catch elements is provided with a downwardly disposed hemispherically shaped protruberance 55. Complementarily shaped receptacles 56 are formed in the forward portions of the frame in positions to receive the protruberance 55 and alternately to releasably maintain the catch elements in positions to receive the bolt 45, as shown in Fig. 7, or to hold the bolt in engagement, as shown in Fig. 9. To urge the protruberances into the receptacles, helical compression springs 57 are provided on the posts 52 in abutting relation to the catch elements and are adjustably compressed by means of nuts 58 screw-threadedly engaged to the posts. For ease of operation washers 59 are interposed the nuts and the springs. The cap piece 48 is apertured at 60 to receive the posts, springs, and nuts so as to permit external access to the nuts and adjustable control of the spring forces exerted on the catch elements and thus the tenacity with which said catch elements are retained in the alternate positions described. The enlarged end portion 46 is preferably rounded to assist in functioning as a pilot for positioning the bolt in the catch element.

To connect the forward 19 and rearward 20 portions of the frame, the rearward portion is thrust forwardly relative to said forward portion, the bolt enters the opening 47, the enlarged end portion thereof contacts the trigger legs 53 and rotates the catch elements 51 to the positions shown in Fig. 9. So positioned the protruberances 55 engage in their respective receptacles 56 and releasably maintain the catch elements in position with the bolt embracing legs in clasping relation to the bolt with the enlarged end portion inwardly disposed therefrom. Any drag imposed on the rearward portion of the frame exceeding a predetermined magnitude, determined by the adjustable spring force exerted on the catch elements, rotates said catch elements in the opposite direction, and returns them to the positions shown in Fig. 7, with the bolt released and the rearward portion of the frame free for rearward pivotal movement. To the end of guiding the engaging and disengaging of the latch 16, a guide plate 61 is positioned in underlaying relation to said latch and secured to the forward portion of the frame as by welding.

The shoe 14, of any suitable form, conventional or otherwise, is provided laterally disposed to the frame, at the side thereof releasable by the latch for rearward pivotal movement, and is substantially aligned with the normal direction of movement of the frame. The shoe employs a base plate 71 longitudinally arranged therein, a wrist element 72 upwardly extended from the rearward end of the base plate, and a housing 73 enclosing certain working elements of the mower presently described. The housing is preferably of sheet metal or other material providing sufficient rigidity for mounting purposes.

The mounting means 17 interconnects the rearward portion 20 of the frame and the shoe 14 and provides elevational control and tipped attitude regulation of the shoe. The mounting means comprises a pair of substantially parallel mounting arms 75 pivotally interconnecting the frame and the housing 73. The mounting arms preferably are articulated as at 76 to provide relative jack-knife movement of opposite end portions thereof. Thus the mounting arms not only provide pivotal movement relative to the frame and pivotal movement relative to the shoe, but also provide for variation of the spaced relation of said shoe and the frame. Stops 77 are provided on the frame in positions abuttable with the mounting arms to preclude the end portions thereof connected to the frame from swinging inwardly beyond a substantially erect position. A positioning arm 78 is pivotally connected to the upwardly extended end portion of the wrist element 72 and extending inwardly relative to the frame in overlaying relation to the fulcrum bearing 41. A pinion gear 79 is journaled in the frame adjacent the inwardly disposed end portion of the positioning arm 78. Said inwardly disposed end portion of the positioning arm is pivotally connected to the pinion gear near the periphery thereof as at 80. To the end of providing controlled rotation of the pinion gear and thus for endward and pivotal movement of the positioning arm over the fulcrum bearing, an hydraulic two-way ram 81 is mounted transversely in the frame on the control struts 37. The two-way ram is motivated and controlled in the conventional manner, as from a hydraulic pump 82 mounted on the tractor, fluid conduits 83, and a control valve 84 provided in the conduits. The ram is provided with a rack gear 85 engaged with the pinion gear 79. A roller 86 journaled in the frame oppositely disposed to the rack gear from the pinion gear serves to maintain the rack gear and pinion gear engagement. As demonstrated in Figs. 10, 11 and 12, the ram is employed to move the rack gear outwardly, to rotate the pinion gear clockwise, as seen in said figures to raise and to tip the shoe. As the rack gear moves to the right, the inwardly extended end portion of the positioning arm is motivated through a downwardly, concaved arcuate path causing the outwardly extended end portion thereof connected to the wrist element to traverse an arcuate upwardly concave path inwardly toward the frame. During the first part of said movement the positioning arm is pivoted over the fulcrum bearing 41 causing the shoe to be elevated with substantially no change in its attitude, as in Fig. 11. During this elevating of the shoe the mounting arms jack-knife as shown. To preclude further jack-knifing of the positioning arm, and thus to achieve a change in attitude of the shoe, stops 87 are provided on an end portion of each of the mounting arms abuttable with its corresponding end portion. Continued rotation of the pinion gear causes the positioning arm not only to pivot over the fulcrum bearing, but to be drawn inwardly thereacross resulting in a tipping of the shoe as shown in full line in Fig. 12. Such inward tipping of the shoe, once the base plate 71 passes alignment with the portions of the mounting arms connected to the shoe, tends to straighten the mounting arms further enhancing the inward tipping of the shoe. Still further rotation of the pinion gear in a clockwise direction, as shown in dotted line in Fig. 12, causes the shoe to continue its tipping action until it is laying on its side as shown in dotted line in Fig. 12. In such position the shoe is considered to be in inoperable position. The relative positions of the sickle bar 15 during such tipping of the shoe are also shown in Figs. 10 and 11. To return the shoe and sickle bar to operable position the reverse procedure is followed, the rack gear withdrawn and the pinion gear motivated in a counter-clockwise rotation, as viewed in the figures indicated. This reverse procedure serves first to return the shoe to a substantially erect position and the sickle bar to a substantially horizontal attitude, and subsequently to lower the shoe and sickle bar in said attitudes for operation.

As is well known in mowers, the sickle bar 15 is laterally and slightly forwardly extended from the shoe for cutting purposes, as shown in Fig. 1. The structure of the sickle bar of the present invention, however, is believed to be an improvement over that heretofore known. An I beam 91 is secured to the base plate 71 in the shoe in fixed laterally and forwardly extended position relative thereto. This is accomplished by welding or any other suitable means. As seen in Fig. 16, a bottom plate 92 is secured in substantially horizontal position below the I beam and preferably in substantial alignment therewith. The forwardly disposed edge portion of the bottom plate is provided with a plurality of spaced guard mounting extensions 93 substantially aligned with the normal direction of movement of the mower. The guard extensions have formed thereon keys 94 upwardly extended to engage guards.

A plurality of guards 95, formed to overlay the guard extensions 93 and having key-ways 96 formed therein to receive the keys 94, are positioned on said guard extensions in coincidence therewith in forwardly extended positions. The guards preferably have pointed forward end portions to separate encountered hay and the like and are transversely and substantially horizontally slotted at the rearward end portions, as at 97, to receive the sickle. As is well known in mowers, the guards not only serve to separate the hay and the like as it approaches the sickle, but in cooperation with the sickle exercise a shearing action on the hay. This shearing action tends to wear the guards. It is conventional to replace the guards when they are worn to an extent precluding efficient cutting action. In the present invention necessity for replacing the guards is obviated. As shown in Fig. 17, the guards are provided with transverse channels 98 downwardly disposed the transverse slot, said channels having wider base portions than top portion and being narrower at one side of the guard than at the other. The wider ends of the channels are preferably formed in the sides of the guards first approached by the sickle during operation. Guard inserts 99 of a configuration complementary to the channels 98 and having flattened upper surfaces are mounted in the channels by being driven into the same. Dragging of the sickle across the guard inserts tends to maintain the inserts in guard engagement. To remove the inserts for replacement, they are merely tapped in the direction opposite to the travel of the sickle. The guards are secured in position by means of bolts 100 extended through apertures in the bottom of the channel 98. The bolts are preferably of the flat headed type and are imbedded in the guards at the bottoms of the channels and subsequently covered by the emplacing of the inserts.

A drive sprocket 103 is journaled in the shoe near the inner end of the I beam 91 and an idler sprocket 104 is journaled in the outwardly extended end portion of the I beam positioned to have a common plane of rotation. A pair of channel guide elements 105 are positioned in substantially parallel arrangement on opposite sides of the I beam, with their respective channels forwardly and rearwardly disposed the I beam respectively, and each in positions in which their channels are substantially tangentially related to the peripheries of the drive sprocket and the idler sprocket. The channelled elements are secured in position as by stub bolts 106 extended through the bottom plate 92 and engaged with their respective channels. Spacing braces 107 interconnect the upper portion of the I beam and the upper portions of the respective channelled elements in fixed spaced relation. The channelled elements are provided with inserts 108 frictionally maintained in engagement with the channels thereof. The inserts in turn provide channels adapted to receive the sickle 15 of the present invention. A substantially stream-lined housing 109 having inwardly disposed mounting flanges 110 serves to contain the I beam and the channelled elements and to preclude the tangling of hay and other material being cut by the mower. The housing is slideably fitted over the I beam, the mounting flanges engaging the channelled elements, and is secured in position by bolts 111 extended therethrough and screw-threadedly engaged with the I beam. Spacers 112 are provided on the bolts to preclude the crushing of the housing against the I beam by the tightening of the bolts. The housing is longitudinally slotted at 113 in juxtaposed relation to the transverse guard slots 97 for extension of sickle teeth therethrough for cutting operations.

The outwardly extended end portion of the sickle bar is provided with a swath-board 119 which functions in the usual manner in dividing and directing hay and the like approached by the sickle bar.

The sickle 16 consists of an endless chain of interconnected link elements 120, a form of which is shown in Fig. 13. The link element comprises a body 121 of a width and thickness adapted to be slideably traveled in the channel inserts 108, having a sprocket teeth engaging opening 122 formed centrally therein, a bifurcated end portion 123, and a longitudinally extended connecting finger 124 oppositely disposed the bifurcated end portion. The bifurcated end portions are formed so that the fingers may be received by the bifurcated end portions of successive link members. The bifurcated end portions and the fingers are formed with juxtaposed aligned openings 125 and 126 respectively. The link members are connected in the endless chain relationship to form the sickle by means of connecting pins 127 inserted in the aligned openings 125 and 126. The pins are of a length substantially equal to, or slightly less than, the width of the link elements. Said pins are preferably secured in the body members 121 by means of set screws 128. As shown in Fig. 16, the body members are erectly positioned in the channel inserts 108 and circuitously traveled about the sprockets 103 and 104 respectively.

A cutting tooth 129 is laterally extended from the body member and is spaced from the lower edge thereof a distance adapted to cause the tooth to traverse the guard inserts 99 in intimate contact therewith whereby a shearing action on encountering hay and the like is exercised. For general use, the cutting teeth take the form of a right angle triangle having the base secured to the body member 121; the hypotenuse side of the triangular tooth being disposed in the direction of travel of the sickle and being upwardly beveled to provide a sharpened cutting edge 130 adjacent the guard insert.

The form of cutting tooth shown in Fig. 18 is of all-purpose configuration. It is evident that the present invention is not limited to such a tooth, other forms thereof being shown in Figs. 19 and 20 respectively. The link element shown in Fig. 19 employs a body of the type already described and mounts a cutting tooth 135 peculiarly suited to the cutting of dry hay. The cutting tooth 135 is hook-shaped and provides a concave, arcuate, sharpened, cutting edge 136. The hooked form is conducive to the gathering of dry material and the pulling of the same inwardly toward the sickle for efficient cutting thereof as the teeth traverse the guard inserts.

A further form of sickle link is shown in Fig. 20 employing a body 121 of the type already described. The teeth 137 extended from the body member are of a specialized configuration adapted to the cutting of green hay and the like without clogging. The teeth 137 are laterally extended as the teeth previously described and are arranged in adjacent and aligned pairs, each providing forwardly disposed substantially straight cutting edges 138.

As shown in Figs. 1 and 2 and in detail in Fig. 13, a drive shaft 160 is journaled in the frame 13 by bearings 161 mounted on the bearing supports 36. The drive shaft is preferably aligned with the rotary power take-off 12 of the tractor 10.

The drive shaft and the rotary power take-off are interconnected by a telescopic motivating shaft 162 connected to the rotary power take-off by means of a universal joint 163 and to the drive shaft by a universal joint 164. The motivating shaft conveniently comprises a hollow triangular outer portion secured to the universal joint 163 and an inner triangular portion slideably received therein connected to universal joint 164. A sheave 165 is keyed to the drive shaft 160 to rotate in unitary relation therewith. A pair of sheaves 170 and 171 respectively of different diameters, 171 being larger than 170, are joined in unitary relation on a mounting shaft 172 journaled in the frame as at 173. A belt 174, preferably of V-type, is positioned in circumjacent relation to the sheave 165 and alternately engages the sheaves 170 and 171. The belt thus has driven connection with the first sheave 165 and driving connection with the second sheaves 170 and 171, driving the latter and the shaft on which they are mounted, at speeds dependent upon which of the second sheaves the belt engages. A third sheave 175 is fixedly mounted on the shaft 172 and rotates therewith.

As previously described, the drive sprocket 103 is mounted on the base plate 71 of the shoe 14. This is conveniently accomplished by an inverted U-shaped shaft 180 connected to the base plate in a position substantially aligned with the normal direction of movement of the frame. The sprocket is journaled on the shaft and is urged upwardly by a helical compression spring 181 positioned between the base plate and the drive sprocket. A thrust washer 182 is interposed the compression spring and the sprocket. The sprocket is provided with an upwardly disposed, concentrically arranged, radially corrugated clutch plate 183. An upper clutch plate 184, having radial corrugations of complementary shape formed downwardly disposed thereon, and having a concentrically arranged beveled gear portion 185 is journaled on the U-shaped shaft 180. To maintain the upper clutch plate in position a thrust bearing 186 is mounted on the shaft 180 thereabove. A beveled gear 187 is journaled on the upper portion of the U-shaped shaft in driving engagement with the beveled gear 185 of the upper clutch plate. A sheave 188 is journaled on the U-shaped shaft in unitary relation with the beveled gear 187. Thrust bearings 189 serve to maintain the beveled gear and sheave in position, with the sheave 188 in substantial alignment with the so-called third sheave 175. A V-belt 190 serves to translate rotation of the third sheave into rotation of the sheave 188 which in turn through the beveled gear 185 and the clutch plates 183 and 184 rotate the sprocket 103. It is clearly apparent that drag of sufficient magnitude imposed upon the sprocket 103 causes the radial corrugations on the clutch plates to slip relative to each other. The force with which the compression spring 181 urges the sprocket upwardly determines the magnitude of the drag necessary to slip the clutch means. This has the obvious advantage of saving the drive linkage 18, now described, from damage incident to the encountering of an obstruction by the sickle 16.

A monitoring means, indicated generally at 200, serves to translate resistance to motivation of the sprocket 103 into controlled positioning of the belt 174 on the second sheaves 170 and 171 respectively, thus to alter sickle speed of travel in response to cutting resistance encountered. A substantially horizontal plate 201 is mounted on the forward bearing support 36 and in turn mounts a pillow block 202 adjacent the upper side of the belt 174. An L-shaped shaft 203 has a substantially horizontal leg portion slideably mounted in the pillow block transversely disposed the belt and a depending leg portion. A bracket 204, having an elongated opening 205 formed therein, is forwardly extended from the block and serves to guide the L-shaped shaft in slideable reciprocation transversely related to the belt. An idler sheave 206 is mounted on the horizontal portion of the shaft in engagement with the belt 174. A helical compression spring 207 is provided on the horizontal portion of the L-shaped shaft between the erect portion thereof and the pillow block. The compression spring serves to urge the shaft forwardly, to draw the idler sheave forwardly and thus to position the belt 174 on the foremost 171 of the second sheaves which preferably is of the greater diameter. When so positioned, the belt 174 engages the sheave 171 and the sickle is motivated at the slower of two speeds relative to rotation of the first sheave 165.

To urge the idler sheave rearwardly to shift the belt to the smaller 170 of the second sheaves, a wedge-shaped cam 208 is slideably mounted in a groove 209 formed in the plate 201 transversely disposed the frame and positioned to bring the wedge-shaped cam into engagement with the erect leg portion of the L-shaped shaft 203. A monitoring bearing 210 is mounted on the plate transversely disposed the cam and in substantial alignment with the normal direction of movement of the frame 13. A lever arm 211 is journaled in the bearing 210 and at the rear end thereof is outwardly extended to a position adjacent the belt 190. A T-head 212 is provided on the outwardly extended end portion of the lever arm and mounts an idler sheave 213 in engagement with the outwardly disposed side of the V-belt 190. The idler sheave is urged downwardly to displace the V-belt from true alignment between the peripheries of the sheaves 175 and 188 respectively by means of a helical tension spring 214 interconnecting the opposite end portion of the T-head and the frame. The lever arm 211 is upwardly extended at the forward end portion of the bearing 210. A connecting rod 215 pivotally interconnects the upwardly extended end portion of the lever arm and the wedge-shaped cam 208. Thus as increased resistance to motivation is experienced by the drive sprocket 103 the belt 190 tends to tighten at its top portion because of increase tension imposed thereon, causes the second idler sheave 213 to be elevated, moving the upwardly extended end portion of the lever arm 211 forwardly and through the connecting rod 215 urging the wedge-shaped cam forwardly in its opening 209. In engagement with the L-shaped shaft the cam urges said shaft rearwardly resulting in a rearward movement of the sheave 206 shifting the V-belt 174 from the larger sheave 171 to the smaller sheave 170 resulting in an automatic alteration of the driving speed of the sickle. Upon decrease of the resistance to motivation experienced by the sprocket 103 the spring 214 draws the second idler sheave 213 downwardly, and through the linkage of the monitoring means described, moves the idler sheave 206 forwardly returning the belt 174 to the forward sheave 171. Thus, the greater the cutting resistance encountered, the greater is the speed of travel of the sickle so that the sickle teeth make smaller "bites" into encountered material but at more frequent intervals. The sheaves 170 and 171 need be of only slightly different diameters to achieve the differences in driving ratios desired. By employing a V-belt 174 the differences in diameters may readily be taken up in slack in the belt without inducing slipping thereof. It will be clearly apparent that an idler sprocket (not shown) may be employed to take care of slack in the belt 174, if desired.

It is further apparent that the second idler sheave 213 retains the belt 190 in engagement with its respective sheaves as the shoe 14 and sickle bar 15 are elevated as shown in Fig. 11. When the shoe and sickle bar are positioned in inoperative attitudes, as shown in dotted line in Fig. 12, the sheave 188 is moved upwardly and inwardly a distance sufficient to loosen the belt 190 sufficient to cause the same to slip.

Operation

The operation of the mower of the present invention is clearly apparent and is briefly summarized at this point. The frame 13 is connected to the tractor 10 as previously described and ground traversing movement imparted to the mower. The power take-off 12 of the tractor serves to motivate the sickle in orbital travel in the sickle bar also as previously described drawing the sickle teeth across the guard inserts 98 to shear encountered hay and the like. When the hay or other material encountered imposes resistance in excess of a predetermined magnitude on the travel of the sickle, as where the hay is mashed down or is exceedingly thick, the monitoring means 200 shifts the drive linkage 18 as described to increase the speed of travel of the sickle. The increased speed of travel of the sickle results in smaller bites being taken by the sickle teeth and an increased ability to shear the encountered hay. Upon the removal of such increased resistance to cutting, the monitoring means returns the drive linkage to a condition of normal drive.

When the resistance to cutting action is further increased, the clutch means (183—184) is caused to slip permitting the sickle 16 to stop without material damage thereto or to the rest of the mower.

When still further resistance is encountered, causing a severe drag on the sickle bar, as in contacting an obstruction, the latch 22 releases the rearward portion of the frame 23 for rearward pivotal movement, as shown in Fig. 2. After the obstruction is removed, the rearward portion is conveniently re-latched to the forward portion 19 of the frame merely by backing the tractor to close the rearward portion of the frame on the forward portion and to re-engage said latch.

Second form

A second form of the present invention is illustrated in Figs. 21, 22, 23, 24 and 25, respectively. A tractor 220 providing an elevationally positionable tool mounting frame 221 of conventional form allows the mounting of the mower of the present invention independent of the frame 13. A shoe 222, sickle bar 223, and sickle 224 of structure substantially similar to the shoe 14, sickle bar 15 and sickle 16 already described are employed in the second form of the present invention and are not again described at this point. Said shoe, sickle bar and sickle are mounted relative to the frame 221 by means of a mounting means 225 similar to the mounting arms 75, positioning arm 78, ram 81, etc., already described.

A bull wheel 226 is mounted in the frame 221 by means of an axle 227 for rolling movement over earth traversed. The bull wheel comprises a source of power derived from forward movement of the tractor over earth traversed in contrast to the rotary power take-off 12. As shown in Fig. 23, the drive sprocket 103, clutch plate 183, upper clutch plate 184, pivotal gear 187, and sheave 188 are mounted in the shoe as previously described but with the U-shaped shaft 180 transversely disposed the shoe, so as to give the sheave 188 a plane of rotation substantially aligned with the normal direction of movement of the tractor 220.

A shaft 230 is journaled in the frame forwardly disposed the bull wheel 226 and substantially parallel to the axle 227. A sheave 231 is mounted on the axle 227. A pair of second sheaves 232 and 233, similar to sheaves 170 and 171 respectively, are mounted on the shaft 230 in substantial alignment with the sheave 231. A belt 234 functions similarly to the belt 174 in driving the second sheaves from the sheave 231. A third sheave 235 is mounted on the shaft 230 and is rotated thereby. A belt 236 serves to drive the sheave 188 from the sheave 235. A monitoring means 237, duplicating the monitoring means 200 except for the lever arm, is shown in Fig. 23 having elements numbered as previously shown. The lever arm 238, because of the different arrangement of the belts, differs in form from the lever arm 211. Said lever arm 238 is journaled in the frame 221 by a bearing 239 forwardly and outwardly extended therefrom the mount the second idler sheave 213 in engagement with the belt 236. A tension spring 240 urges the forwardly and outwardly extended end portion of the lever arm 238 downwardly by interconnecting said lever arm and a bracket 241 therebelow laterally extended from the frame. The lever arm 238 is upwardly extended from the bearing 239 and connects to the connecting rod 215 in the manner previously described for the lever arm 211. Thus as increased tension is experienced in the top portion of the belt 236, because of increased cutting resistance encountered by the sickle 224, the monitoring means shifts the belt 234 as the monitoring means 200 shifted the belt 174.

The elevating and tipping of the shoe 14 and sickle bar 15 is accomplished as previously described, with a resulting twisting of the belt 236 as illustrated in Figs. 24 and 25. Said twisting of the belt serves to maintain driving connection between the sheave 188 and the sheave 235 as said alteration of elevation and attitude of the shoe occurs.

The mowers of the present invention are of improved form and are characterized by an adaptability to varied operational requirements heretofore unknown in mowing machines. The mowers provide improved safety, speed and efficient characteristics. Positive elevational control of the cutting means exerciseable from the tractor is conducive to convenient and expeditious operation. Wear and deterioration incident to reciprocal movement of conventional sickles have been obviated. The elements of the present invention subjected to the greatest wear are conveniently replaceable. The automatic speed control of the sickle in response to cutting resistance precludes present known necessities for backing mowing machines for renewed attacks on standing hay presenting increased resistance to cutting action. The clutch means and the latch means are improved safety features protecting elements of the mower from damage incident to encountered obstructions.

Although I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

Having described my invention, what I claim as new and desire to secure by Letters Patent is:

1. In a mower having a draft frame, and a sickle bar borne by the draft frame in substantially horizontal attitude, the combination of an endless sickle borne by the sickle bar for substantially horizontal orbital travel, a variable speed driving linkage adapted to connect to a source of power and to motivate the sickle in said orbital travel, and a monitor means translating resistance offered by the sickle to said motivation into speed governing of the driving linkage whereby increased resistance results in responsive increased speed of travel of the sickle.

2. In a mower, having a forwardly movable draft frame; a shoe laterally disposed to said frame and substantially aligned with the normal direction of movement thereof; a sickle bar laterally extended from the shoe in substantially horizontal attitude; a sickle comprising a plurality of linked elements, bearing cutting teeth, circuitously traveled in the sickle bar; mounting means interconnecting the shoe and the frame whereby said shoe and its sickle bar may be elevationally positioned for cutting purposes and the sickle bar pivoted to a substantially erect position in inoperative attitude; the combination of a sheave journaled in the frame and having driven connection to a source of power; a pair of adjacent, coaxially disposed, sheaves of different diameters journaled in the frame in unitary relation in substantial alignment with the first sheave; a belt mounted circumjacent the first sheave and selectively engaged with alternate second sheaves transmitting rotation of the first sheave into responsive rotation of the second sheaves at speeds determined by the selective second sheave engagement; means interconnecting the second sheaves and the sickle and transmitting rotation of the second sheaves into circuitous traveling of the sickle, said means accommodating relative elevational positioning of the shoe and frame and attitude variation of the sickle and including a clutch device, adapted to slip when resistance to travel of the sickle exceeds a predetermined magnitude; and a monitoring means controlling the alternate positioning of the belt on the second sheaves in response to resistance offered to motivation of the sickle.

3. A mower for use in connection with a draft appliance comprising a frame connected to said draft appliance and motivated in ground traversing movement thereby; a shoe borne by the frame in elevationally positionable relation thereto; a sickle bar laterally extended from the shoe in substantially horizontal operational attitude; a plurality of aligned guards forwardly extended from said sickle bar, a sickle comprising a plurality of link elements bearing cutting teeth circuitously traveled in the sickle bar exercising shearing effect on encountered hay and the like in association with the guards; replaceable inserts for the guards engageable with the teeth of the sickle in said shearing action; a sheave journaled in the frame and having driven connection to a source of power; a pair of adjacent coaxially disposed sheaves of different diameters journaled in unitary relation in the frame in substantial alignment with the first sheave; a belt positioned circumjacent the first sheave and selectively engaged with alternate second sheaves whereby rotation of the first sheave is translated into responsive rotation of the second sheaves at speeds determined by selective second sheave engagement; means interconnecting the second sheaves and the sickle and transmitting rotation of the second sheaves into circuitous traveling of the sickle, said means accommodating relative elevational positioning of the shoe and frame and including a clutch device, adapted to slip when resistance to travel of the sickle exceeds a predetermined magnitude; and a monitoring means controlling the positioning of the belt on the second sheaves in response to resistance offered to motivation of the sickle of a magnitude less than that required to slip the clutch device.

4. In a mower having a forwardly movable draft frame, a shoe member laterally disposed to the frame in substantial alignment with the normal direction of movement of the frame, a sickle bar laterally and substantially horizontally extended from the shoe, a sickle borne by the sickle bar disposed for mowing purposes, and means for motivating the sickle, the combination of a plurality of mounting arms pivotally interconnecting the shoe and frame in fixed spaced relation for relative elevational movement, said arms being disposed in a common plane, a pinion gear journaled in the frame, a substantially rigid positioning arm pivotally interconnecting a point on the pinion gear radially removed from the journaled mounting thereof and a point of the shoe elevationally displaced from the mounting arms in fixed spaced relation and for relative elevational movement, said mounting arms and positioning arm being in substantial parallel relation when the shoe and sickle bar are in mowing position, a fulcrum bearing mounted on the frame in positioning arm engagement intermediate the pinion gear and the shoe, spaced from the shoe when the shoe is in operating position a distance substantially equal to the length of the mounting arms and maintaining engaged portions of the positioning arm in constant elevational relation to the frame, and means for controllably rotating the pinion gear whereby initial rotation thereof elevates the shoe and sickle bar in substantially horizontal attitude as the positioning arm is fulcrumed over the bearing and further rotation thereof drags the positioning arm over the bearing and tips the sickle bar upwardly to inoperable position.

5. In a mower having a forwardly movable draft frame, a shoe member laterally disposed to the frame in substantial alignment with the normal direction of movement thereof, and a sickle bar laterally extended from the shoe, the combination of a plurality of substantially vertically pivotal mounting arms pivotally interconnecting the frame and the shoe in fixed spaced relation and disposed in a common plane longitudinal of the shoe, a positioning arm pivotally connected to the shoe at a position elevationally displaced from the mounting arms, a fulcrum mounted on the frame and engaged with the positioning arm and over which said arm is slideably and pivotally extended inwardly disposed to the frame, the fulcrum being spaced from the shoe when the shoe is in operable position a distance substantially equal to the length of the mounting arms, and means for imparting controlled arcuate downward and inward reciprocal travel to the inwardly extended end of the positioning arm whereby responsive arcuate upward and inward movement is imparted to the end of the positioning arm connected to the shoe and whereby the shoe and sickle bar are elevationally controlled while maintaining a substantially horizontal attitude by pivoting of the positioning arm over the fulcrum and said sickle bar is pivoted to a substantially erect, non-operational position by the dragging of the positioning arm inwardly over the fulcrum by said arcuate travel imparted to the inwardly disposed end of the positioning bar.

6. In a mower having a support frame, a shoe, and a sickle bar extended therefrom; a mounting mechanism supporting the shoe and sickle bar on the frame comprising vertically pivotal mounting arms interconnecting the frame and the shoe in fixed spaced relation; a vertically pivotal positioning arm interconnecting the shoe and the frame in substantial parallel relation to the mounting arms and elevationally spaced therefrom; means for positively controlling the vertical pivotal movement of the positioning arm and subsequent to elevation of the end of the positioning arm connected to the shoe for drawing the positioning arm endwardly toward the frame when said arm is pivotally elevated whereby the shoe and sickle bar are elevationally positioned for cutting purposes and the sickle bar upwardly pivoted to inoperable position from an elevated cutting position.

7. In a mower having a forwardly movable support frame, shoe, sickle bar, and sickle traveled in the sickle bar, a variable speed drive linkage therefor comprising a sheave journaled in the frame and having driven connection with a source of power, a pair of sheaves of different diameters journaled in the frame in unitary relation and in substantial alignment with the first sheave, a belt having driven engagement with the first sheave and driving connection with the second sheaves through alternate engagement therewith, a third sheave journaled in the frame and rotated in unitary relation with said second sheaves, a sheave journaled in the shoe in substantial alignment with said third sheave, a second belt having driven engagement with the third sheave and driving connection with the sheave in the shoe, means motivating the sickle in response to the driving of the sheave in the shoe, and monitoring means translating sickle resistance to motivation as determined by driving stress experienced by the second belt into selective alternate second sheave engagment by the first belt whereby said sickle resistance and the speed with which said sickle is driven are positively correlated.

8. In a mower having a forwardly movable support frame, shoe, sickle bar, and sickle traveled in the sickle bar, a variable speed drive linkage therefor comprising a sheave journaled in the frame and having driven connection with a source of power, a pair of sheaves of different diameters journaled in the frame in unitary relation and in substantial alignment with the first sheave, a belt having driven engagement with the first sheave and driving connection with the second sheaves through alternate engagement therewith, a third sheave journaled in the frame and rotated in unitary relation with said second sheaves, a sheave journaled in the shoe in substantial alignment with said third sheave, a second belt having driven engagement with the third sheave and driving connection with the sheave in the shoe, clutch means motivating the sickle in response to the driving of the sheave in the shoe, said clutch being adapted to slip upon resistance of the sickle to motivation exceeding a predetermined magnitude, and monitoring means translating sickle resistance to motivation as determined by driving tension experience by the second belt into selective alternate second sheave engagement by the first belt whereby sickle speed is increased in response to increase in driving tension in the second belt.

9. A mower comprising a draft frame having a forward portion adapted for connection to a draft appliance having a power take-off, a rearward portion connected at a side of the frame to the forward portion for substantially horizontal rearward pivotal movement, and a pressure responsive latch means releasably interconnecting the forward portion and the rearward portion at positions radially removed from their pivotal interconnection; a shoe laterally adjacent to the rearward portion of the frame at the side opposite to the pivotal interconnection of the frame portions; a pair of mounting arms pivotally interconnecting the shoe and the rearward portion of the frame in fixed spaced relation for relative elevational movement, said arms being disposed in a common plane; a pinion gear journaled in the rearward portion of the frame substantially parallel to the mounting arms; a positioning arm pivotally interconnecting a point on the pinion gear radially removed from the journaled mounting thereof and a point on the shoe elevationally displaced from the mounting arms in fixed spaced relation and for relative elevational movement; a fulcrum bearing mounted in the frame in positioning arm engagement intermediate the pinion gear and the shoe and maintaining engaged portions of the positioning arm in constant elevational relation to the frame; means for controllably rotating the pinion gear; a sickle bar laterally extended from the shoe; an endless sickle mounted in the bar for orbital travel; a sheave journaled in the rearward portion of the frame for rotation about an axis longitudinally of the frame; a telescopic drive linkage mounted in the forward portion of the frame, having driving connection with the sheave at one end and adapted for connection to the power take-off of the draft appliance at the other end; a pair of adjacent coaxially disposed sheaves of different diameters journaled in the rearward portion of the frame in unitary relation in substantial alignment with the first sheave; a belt mounted circumjacent the first sheave and selectively engaged with alternate second sheaves transmitting rotation of the first sheave into responsive rotation of the second sheaves at speeds determined by selective second sheave engagement; means interconnecting the second sheaves and the sickle and transmitting rotation of the second sheaves into orbital traveling of the sickle, said means accommodating relative elevational positioning of the shoe and frame and attitude variation of the sickle; and a monitoring means controlling the alternate positioning of the belt on the second sheaves in response to resistance offered to motivation of the sickle whereby increased resistance results in increased speed of motivation.

AUSTIN G. GOODNIGHT.

REFERENCES CITED

The following references are of record in the file of this patent:

UNITED STATES PATENTS

| Number | Name | Date |
| --- | --- | --- |
| Re. 18,333 | Reeves | Jan. 12, 1932 |
| 7,481 | Peirson | July 2, 1850 |
| 78,515 | Christy | June 2, 1868 |
| 591,606 | Martin | Oct. 12, 1897 |
| 1,105,751 | Bruce | Aug. 4, 1914 |
| 1,206,554 | Leidecker | Nov. 28, 1916 |
| 1,228,403 | Butcher | June 5, 1917 |
| 1,537,850 | Magoon | May 12, 1925 |
| 1,672,250 | Felton | June 5, 1928 |
| 2,329,881 | Clapper | Sept. 21, 1943 |
| 2,403,365 | Hilblom | July 2, 1946 |